(12) United States Patent
Tonouchi

(10) Patent No.: US 9,396,432 B2
(45) Date of Patent: Jul. 19, 2016

(54) AGREEMENT BREACH PREDICTION SYSTEM, AGREEMENT BREACH PREDICTION METHOD AND AGREEMENT BREACH PREDICTION PROGRAM

(75) Inventor: Toshio Tonouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 13/702,017

(22) PCT Filed: May 20, 2011

(86) PCT No.: PCT/JP2011/061673
§ 371 (c)(1),
(2), (4) Date: Dec. 4, 2012

(87) PCT Pub. No.: WO2011/155308
PCT Pub. Date: Dec. 15, 2011

(65) Prior Publication Data
US 2013/0080367 A1    Mar. 28, 2013

(30) Foreign Application Priority Data
Jun. 9, 2010 (JP) .................... 2010-132300

(51) Int. Cl.
*G06N 5/02* (2006.01)
*G06Q 10/06* (2012.01)
*H04L 12/813* (2013.01)

(52) U.S. Cl.
CPC .............. *G06N 5/02* (2013.01); *G06Q 10/06* (2013.01); *G06Q 10/0639* (2013.01); *H04L 47/20* (2013.01)

(58) Field of Classification Search
None
See application file for complete search history.

(56) References Cited

U.S. PATENT DOCUMENTS 5,538,897 A * 7/1996 Yates, III ................. C07K 1/00
436/173
5,867,494 A * 2/1999 Krishnaswamy ... H04L 65/4038
370/352

(Continued)

FOREIGN PATENT DOCUMENTS

JP 2003-150723 5/2003
JP 2004-532445 10/2004

(Continued)

OTHER PUBLICATIONS

Bartolini et al., "IT Service Management Driven by Business Objectives: An Application to Incident Management," Proceedings, the 10th IEEE/IFIP Network Operations and Management Symposium, Apr. 3-7, 2006, Vancouver, Canada, 10 pages., 2006.*

(Continued)

*Primary Examiner* — Kakali Chaki
*Assistant Examiner* — Fuming Wu
(74) *Attorney, Agent, or Firm* — Young & Thompson

(57) ABSTRACT

In order to improve the prediction accuracy of a service level agreement breach, an agreement breach prediction system includes: a probability distribution calculation unit that calculates a probability distribution of a measured value for each event; a probability calculation unit that calculates, for each event, a probability that applies to an SLA breach and a probability that does not applies to an SLA breach; an SLA distribution calculation unit that calculates a probability density of a measured value corresponding to the SLA breach; and a breach occurrence probability calculation unit that, when the event occurs, calculates a probability that the SLA breach occurs within the predefined time after the occurrence of the event, by using the respective probabilities corresponding to the event, and the respective probability densities corresponding to the measured values at the time of event occurrence.

7 Claims, 16 Drawing Sheets

(56) References Cited

U.S. PATENT DOCUMENTS

| | | | |
|---|---|---|---|
| 6,321,179 B1* | 11/2001 | Glance | G06Q 30/02 |
| | | | 702/189 |
| 7,006,435 B1* | 2/2006 | Davies | H04L 1/0001 |
| | | | 370/230 |
| 7,145,898 B1* | 12/2006 | Elliott | H04L 12/66 |
| | | | 370/352 |
| 7,313,533 B2 | 12/2007 | Chang et al. | |
| 7,546,039 B1* | 6/2009 | Boroditsky | G02B 27/286 |
| | | | 359/489.01 |
| 7,957,413 B2 | 6/2011 | Childress et al. | |
| 8,041,797 B2* | 10/2011 | Childress | G06Q 10/06 |
| | | | 370/254 |
| 2003/0125888 A1* | 7/2003 | Yamaguchi | H04L 1/205 |
| | | | 702/69 |
| 2003/0200075 A1 | 10/2003 | Meng et al. | |
| 2003/0200191 A1 | 10/2003 | Pao et al. | |
| 2004/0019574 A1 | 1/2004 | Meng et al. | |
| 2004/0136379 A1* | 7/2004 | Liao | H04L 12/5695 |
| | | | 370/395.21 |
| 2004/0215430 A1 | 10/2004 | Huddleston et al. | |
| 2004/0220900 A1 | 11/2004 | Yang et al. | |
| 2004/0261044 A1* | 12/2004 | Yonezawa | G06F 17/5036 |
| | | | 716/56 |
| 2005/0010456 A1 | 1/2005 | Chang et al. | |
| 2005/0165925 A1* | 7/2005 | Dan | G06F 9/5083 |
| | | | 709/224 |
| 2006/0149854 A1* | 7/2006 | Rudkin | H04L 12/14 |
| | | | 709/241 |
| 2006/0227810 A1 | 10/2006 | Childress et al. | |
| 2007/0226228 A1 | 9/2007 | Her et al. | |
| 2007/0239496 A1* | 10/2007 | Supatgiat | G06F 17/5009 |
| | | | 703/2 |
| 2008/0097807 A1 | 4/2008 | Chang et al. | |
| 2008/0098454 A1 | 4/2008 | Toh | |
| 2008/0148225 A1* | 6/2008 | Sarkar | G06F 8/10 |
| | | | 717/107 |
| 2008/0228755 A1 | 9/2008 | Haga et al. | |
| 2009/0076859 A1* | 3/2009 | Phillips | G06Q 40/00 |
| | | | 705/4 |
| 2011/0161497 A1 | 6/2011 | Childress et al. | |
| 2013/0080367 A1* | 3/2013 | Tonouchi | G06N 5/02 |
| | | | 706/46 |

FOREIGN PATENT DOCUMENTS

| | | | | |
|---|---|---|---|---|
| JP | 2005-523526 | 8/2005 | | |
| JP | 2007-529048 | 10/2007 | | |
| JP | 2008-519327 | 6/2008 | | |
| JP | 2008-535113 | 8/2008 | | |
| JP | 2008-225995 | 9/2008 | | |
| JP | WO 2009144780 A1 * | 12/2009 | | G05B 19/41865 |
| JP | WO 2011155308 A1 * | 12/2011 | | G06N 5/02 |
| WO | WO 02/067136 | 8/2002 | | |
| WO | WO 03/090147 | 10/2003 | | |
| WO | WO 2005/008402 | 1/2005 | | |
| WO | WO 2006/010692 | 2/2006 | | |
| WO | WO 2006/049584 | 5/2006 | | |
| WO | 2006/106142 | 10/2006 | | |
| WO | WO 2006/106921 | 10/2006 | | |
| WO | WO 2009144780 A1 * | 12/2009 | | |
| WO | WO 2011155308 A1 * | 12/2011 | | |

OTHER PUBLICATIONS

Bartolini, et al, "IT service management driven by business objectives: an application to incident management," HPL-2006-38, 2006.*

International Search Report, PCT/JP2011/061673, Jun. 28, 2011.

P. Domingos/M. Pazzani co-authors "On the Optimality of the Simple Bayesian Classifier under Zero-One Loss", Machine Learning, 29, pp. 103-130, 1997 Kluwer Academic Publishers, Manufactured in The Netherlands.

Tsuyoshi Furukawa, "A Study of SLM functions about a VoIP service", IEICE Technical Report, Dec. 10, 2001, vol. 101, No. 508, pp. 97 to 102.

Sho Ishikawa, "Web site design using user model with Bayesian networks", Proceedings of DBWeb2005, Nov. 21, 2005, vol. 2005, pp. 141 to 147.

* cited by examiner

Fig. 2

| EVENT OCCURRENCE TIME | OCCURRENCE SITE | EVENT MESSAGE | EVENT TYPE |
|---|---|---|---|
| 2009/1/20 17:30 | ubila6 | syslogd 1.4.1: restart (remote reception). | syslog restart |
| 2009/1/20 17:30 | ubila6 | 1卞-20 17:30:01 syslog: syslogd startup succeeded | syslog: syslogd startup succeeded |
| 2009/1/20 17:30 | ubila6 | kernel: klogd 1.4.1, log source = /proc/kmsg started. | kernel log |
| 2009/1/20 17:30 | ubila6 | 1卞-20 17:30:01 syslog: klogd startup succeeded | syslog: klogd startup succeeded |
| 2009/1/20 17:30 | ubila6 | 1卞-20 17:30:01 syslog: syslogd shutdown succeeded | syslog: syslogd shutdown succeeded |
| 2009/1/20 17:30 | ubila1 | CROND[25221]: (root) CMD (/usr/bin/mrtg /etc/mrtg/mrtg.cfg) | CROND |
| 2009/1/20 17:30 | ubila1 | CROND[25223]: (root) CMD (/usr/lib/sa/sa1 1 1) | CROND |
| 2009/1/20 17:30 | ubila1 | CROND[25225]: (mailman) CMD (/usr/bin/python -S /var/mailman/cron/gate_news) | CROND |
| 2009/1/20 17:35 | ubila7 | sshd[23586]: Accepted publickey for root from 192.168.32.6 port 33436 ssh2 | sshd: Accepted publickey |
| 2009/1/20 17:35 | ubila7 | sshd(pam_unix)[23586]: session opened for user root by (uid=0) | sshd: session opened |
| 2009/1/20 17:35 | ubila7 | sshd(pam_unix)[23586]: session closed for user root | sshd: session closed |
| 2009/1/20 17:35 | ubila7 | sshd[23595]: Accepted publickey for root from 192.168.32.6 port 33437 ssh2 | sshd: Accepted publickey |
| 2009/1/20 17:35 | ubila7 | sshd(pam_unix)[23595]: session opened for user root by (uid=0) | sshd: session opened |
| 2009/1/20 17:35 | ubila7 | INFO [mysql] 060120 17:34:47 /usr/sbin/mysqld: Normal shutdown | INFO [mysql] |
| 2009/1/20 17:35 | ubila7 | INFO [mysql] | INFO [mysql] |
| 2009/1/20 17:35 | ubila7 | INFO [mysql] 060120 17:34:47 InnoDB: Starting shutdown... | INFO [mysql] |
| 2009/1/20 17:35 | ubila7 | sshd(pam_unix)[23595]: session closed for user root | sshd: session closed |
| 2009/1/20 17:35 | ubila7 | sshd[23626]: Accepted publickey for root from 192.168.32.6 port 33439 ssh2 | sshd: Accepted publickey |
| 2009/1/20 17:35 | ubila7 | sshd(pam_unix)[23626]: session opened for user root by (uid=0) | sshd: session opened |
| 2009/1/20 17:35 | ubila7 | sshd(pam_unix)[23626]: session closed for user root | sshd: session closed |
| 2009/1/20 17:35 | ubila7 | INFO [mysql] 060120 17:34:50 InnoDB: Shutdown completed | INFO [mysql] |

Fig. 3

| EVENT OCCURRENCE TIME | MEASURED VALUE OF SLA SERVICE ITEM |
|---|---|
| 2009/1/20 17:30 | 7.22 |
| 2009/1/20 17:35 | 8.08 |
| 2009/1/20 17:40 | 10.88 |
| 2009/1/20 17:44 | 13.70 |
| 2009/1/20 17:45 | 4.37 |
| 2009/1/20 17:49 | 2.51 |
| 2009/1/20 17:50 | 4.66 |
| 2009/1/20 17:55 | 4.62 |
| 2009/1/20 18:00 | −0.73 |
| 2009/1/20 18:01 | 1.04 |
| 2009/1/20 18:05 | 3.81 |
| 2009/1/20 18:10 | 2.90 |
| 2009/1/20 18:15 | 6.27 |
| 2009/1/20 18:20 | 5.94 |
| 2009/1/20 18:25 | 8.17 |
| 2009/1/20 18:30 | −7.38 |
| 2009/1/20 18:35 | −3.35 |
| 2009/1/20 18:40 | 3.21 |
| 2009/1/20 18:45 | 10.22 |
| 2009/1/20 18:50 | −1.94 |
| 2009/1/20 18:55 | 5.52 |
| 2009/1/20 19:00 | 8.78 |
| 2009/1/20 19:01 | 5.03 |
| 2009/1/20 19:02 | 7.57 |
| 2009/1/20 19:05 | 12.60 |
| 2009/1/20 19:10 | 6.32 |
| 2009/1/20 19:15 | 3.32 |
| 2009/1/20 19:20 | 2.24 |
| 2009/1/20 19:25 | 3.63 |
| 2009/1/20 19:30 | −3.53 |
| 2009/1/20 19:35 | 2.87 |
| 2009/1/20 19:40 | 6.63 |
| 2009/1/20 19:45 | −3.26 |

Fig. 4

| EVENT CATEGORY | EVENT TYPE |
|---|---|
| EVENT a | syslog restart |
| EVENT b | syslog: syslogd startup succeeded |
| EVENT c | kernel log |
| EVENT d | syslog: klogd startup succeeded |
| EVENT e | syslog: syslogd shutdown succeeded |
| EVENT f | CROND |
| ... | ... |

Fig. 5

| EVENT P | EVENT a | EVENT b | EVENT c | EVENT d | TOTAL |
|---|---|---|---|---|---|
| MEAN VALUE $E(p|P)$ | 2.18 | 5.56 | 7.02 | 6.47 | 3.91 |
| UNBIASED VARIANCE $V(p|P)$ | 19.44 | 14.30 | 13.12 | 10.54 | 17.46 |

Fig. 6

| EVENT E  | EVENT a | EVENT b | EVENT c | EVENT d | TOTAL |
|----------|---------|---------|---------|---------|-------|
| Pr(○)    |         |         |         |         | 0.79  |
| Pr(×)    |         |         |         |         | 0.21  |
| Pr(E\|○) | 0.18    | 0.26    | 0.30    | 0.36    |       |
| Pr(E\|×) | 0.17    | 0.24    | 0.25    | 0.44    |       |

Fig. 7

| EVENT E | | a | b | c | d | TOTAL |
|---|---|---|---|---|---|---|
| TOTAL NUMBER OF TIMES | | 41 | 58 | 66 | 87 | 229 |
| BREACH | NEGATIVE: ○ | 31 | 48 | 54 | 65 | 179 |
| | AFFIRMATIVE: × | 10 | 10 | 12 | 22 | 50 |
| MEAN $E(p(t+\delta t)|E)$ | | 4.58 | 3.63 | 3.55 | 4.41 | 4.15 |
| UNBIASED VARIANCE $V(p(t+\delta t))$ | | 17.75 | 26.96 | 25.02 | 27.39 | 23.70 |
| STANDARD DEVIATION | | 4.21 | 5.19 | 5.00 | 5.23 | 4.87 |
| $Pr(○|E)$ | | 0.79 | 0.80 | 0.81 | 0.75 | 0.79 |
| $Pr(×|E)$ | | 0.21 | 0.20 | 0.19 | 0.25 | 0.21 |
| BREACH EXPECTED VALUE | NEGATIVE: ○ | 32.44 | 46.40 | 53.68 | 65.57 | 179.80 |
| | AFFIRMATIVE: × | 8.56 | 11.60 | 12.32 | 21.43 | 49.20 |
| $Pr(E|○)$ | | 0.18 | 0.26 | 0.30 | 0.36 | |
| $Pr(E|×)$ | | 0.17 | 0.24 | 0.25 | 0.44 | |

Fig. 8

| BREACH OCCURRENCE OR NON-OCCURRENCE R | ○ | × |
|---|---|---|
| MEAN VALUE $E(p\|R)$ | 2.86 | 10.26 |
| UNBIASED VARIANCE $V(p\|R)$ | 10.71 | 3.49 |
| DEVIATION | 3.27 | 1.87 |

Fig. 13

| EVENT OCCURRENCE TIME | SLA MEASURED VALUE | WORST VALUE | EVENT a | EVENT b | EVENT c | EVENT d |
|---|---|---|---|---|---|---|
| 2009/1/20 17:30 | 7.22 | 6.65 | 0 | 0 | 0 | 0 |
| 2009/1/20 17:35 | 8.08 | 8.52 | 0 | 0 | 1 | 1 |
| 2009/1/20 17:40 | 10.88 | 10.79 | 0 | 0 | 0 | 1 |
| 2009/1/20 17:44 | 13.70 | 13.75 | 0 | 0 | 0 | 0 |
| 2009/1/20 17:45 | 4.37 | 6.55 | 0 | 0 | 1 | 0 |
| 2009/1/20 17:49 | 2.51 | 3.45 | 0 | 0 | 0 | 1 |
| 2009/1/20 17:50 | 4.66 | 5.78 | 0 | 0 | 1 | 0 |
| 2009/1/20 17:55 | 4.62 | 6.22 | 0 | 0 | 0 | 0 |
| 2009/1/20 18:00 | -0.73 | -0.93 | 0 | 0 | 0 | 0 |
| 2009/1/20 18:01 | 1.04 | 0.36 | 1 | 0 | 0 | 1 |
| 2009/1/20 18:05 | 3.81 | 2.04 | 0 | 1 | 0 | 0 |
| 2009/1/20 18:10 | 2.90 | 2.85 | 0 | 0 | 0 | 1 |
| 2009/1/20 18:15 | 6.27 | 5.68 | 0 | 0 | 0 | 1 |
| 2009/1/20 18:20 | 5.94 | 7.34 | 0 | 0 | 0 | 0 |
| 2009/1/20 18:25 | 8.17 | 8.23 | 0 | 0 | 0 | 0 |
| 2009/1/20 18:30 | -7.38 | -6.22 | 0 | 1 | 0 | 0 |
| 2009/1/20 18:35 | -3.35 | -2.56 | 0 | 0 | 1 | 1 |
| 2009/1/20 18:40 | 3.21 | 2.47 | 0 | 0 | 0 | 0 |
| 2009/1/20 18:45 | 10.22 | 10.43 | 0 | 0 | 1 | 1 |
| 2009/1/20 18:50 | -1.94 | -2.05 | 0 | 1 | 0 | 1 |
| 2009/1/20 18:55 | 5.52 | 6.08 | 1 | 0 | 0 | 0 |
| 2009/1/20 19:00 | 8.78 | 10.15 | 0 | 0 | 0 | 0 |
| 2009/1/20 19:01 | 5.03 | 2.57 | 0 | 0 | 0 | 1 |
| 2009/1/20 19:02 | 7.57 | 7.57 | 1 | 0 | 1 | 0 |
| 2009/1/20 19:05 | 12.60 | 12.23 | 0 | 0 | 1 | 0 |
| 2009/1/20 19:10 | 6.32 | 7.54 | 0 | 0 | 0 | 0 |
| 2009/1/20 19:15 | 3.32 | 1.39 | 0 | 0 | 1 | 0 |
| 2009/1/20 19:20 | 2.24 | -0.22 | 0 | 0 | 0 | 1 |
| 2009/1/20 19:25 | 3.63 | 4.77 | 0 | 0 | 1 | 0 |
| 2009/1/20 19:30 | -3.53 | -3.20 | 0 | 0 | 1 | 0 |
| 2009/1/20 19:35 | 2.87 | 3.56 | 0 | 0 | 0 | 1 |
| 2009/1/20 19:40 | 6.63 | 5.21 | 0 | 0 | 1 | 0 |
| 2009/1/20 19:45 | -3.26 | -2.27 | 0 | 0 | 0 | 0 |

|  | a\|O | b\|O | c\|O | d\|O | p\|O |
|---|---|---|---|---|---|
| a\|O | 1.00 | 0.00 | 0.09 | -0.01 | -0.16 |
| b\|O |  | 1.00 | -0.10 | -0.09 | 0.22 |
| c\|O |  |  | 1.00 | -0.17 | 0.29 |
| d\|O |  |  |  | 1.00 | 0.45 |
| p\|O |  |  |  |  | 1.00 |

(B)

|  | a\|× | b\|× | c\|× | d\|× | p\|× |
|---|---|---|---|---|---|
| a\|× | 1.00 | 0.18 | 0.06 | 0.15 | 0.06 |
| b\|× |  | 1.00 | -0.19 | 0.22 | 0.19 |
| c\|× |  |  | 1.00 | -0.25 | 0.15 |
| d\|× |  |  |  | 1.00 | 0.38 |
| p\|× |  |  |  |  | 1.00 |

(C)

|  | a | b | c | d |
|---|---|---|---|---|
| δp | -0.10 | 0.01 | 0.04 | 0.03 |

Fig. 15

| EVENT CATEGORY | EVENT TYPE | USE FLAG |
|---|---|---|
| EVENT a | syslog restart | ✓ |
| EVENT b | syslog: syslogd startup succeeded | ✓ |
| EVENT c | kernel log | ✓ |
| EVENT d | syslog: klogd startup succeeded | ✓ |
| EVENT e | syslog: syslogd shutdown succeeded | |
| EVENT f | CROND | ✓ |
| ... | ... | ... |

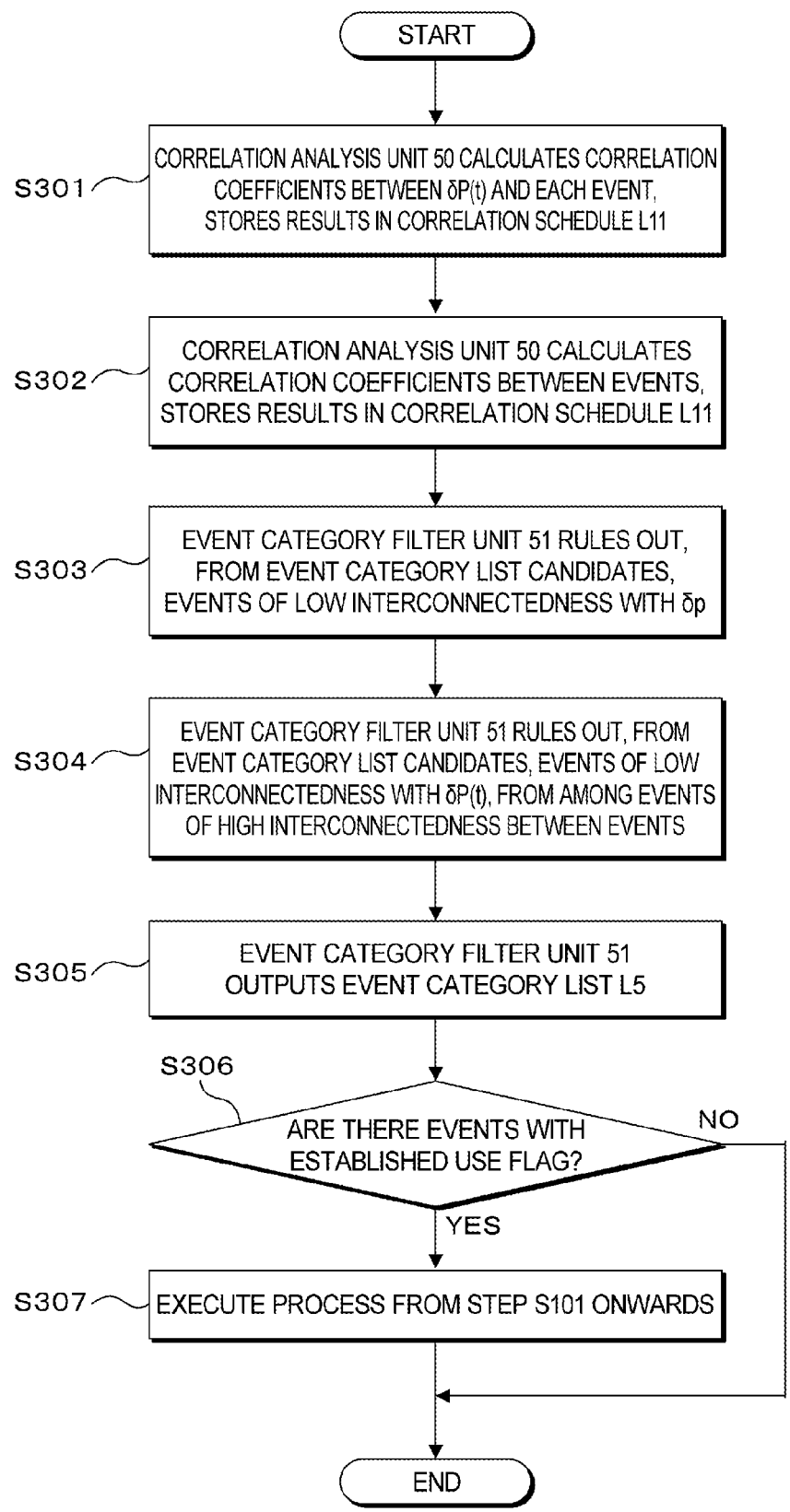

AGREEMENT BREACH PREDICTION SYSTEM, AGREEMENT BREACH PREDICTION METHOD AND AGREEMENT BREACH PREDICTION PROGRAM

BACKGROUND ART

The present invention relates to an agreement breach prediction system, an agreement breach prediction method and an agreement breach prediction program.

Service level agreements (hereafter, "SLAs") that are concluded between customers and service providers such as ISPs, ASPs, SaaS providers and the like, have attracted attention in recent years. For instance, SLAs are agreements that guarantee, for example, the quality of a service that is provided to a customer by a service provider; for instance, the response time of the service does not exceed 3 seconds according to the agreements. It is important for service providers that have entered into SLAs to detect the occurrence of SLA breaches in advance, and deal with the breaches before they occur. Non-Patent Document 1 below (first chapter) discloses a technology for predicting the occurrence of SLA breaches.

Non-Patent Document 1: P. DOMINGOS/M. PAZZANI co-authors, "On the Optimality of the Simple Bayesian Classifier under Zero-One Loss", Machine Learning, 29, pp. 103-130, 1997 Kluwer Academic Publishers, Manufactured in The Netherlands In Non-Patent Document 1, there is calculated a probability $Pr(x|Pi)$ of an SLA breach within a certain period of time, upon occurrence of an event Pi, on the basis of the number of times that an SLA breach occurs within a certain period of time after the occurrence of a given event Pi, and the occurrence of an SLA breach is predicted using that probability. If SLA breaches that occur within a certain period of time are few, the calculated probability $Pr(x|Pi)$ in this method fluctuates significantly, and prediction accuracy decreases when SLA breaches increase or decrease by just one breach. In a conventional simple Bayesian filter, events are handled as discrete values, and the occurrence of an SLA breach is predicted on the basis of whether a threshold value is exceeded or not. Therefore, this precludes continuous handling of parameter values that denote service quality, and finely-tuned prediction of the occurrence of SLA breaches on the basis of breach probabilities that are dissimilar for each parameter value.

SUMMARY

In order to solve the above-described problems, it is an object of the present invention to provide an agreement breach prediction system, an agreement breach prediction method and an agreement breach prediction program in which the prediction accuracy of service level agreement breaches can be improved.

The agreement breach prediction system of the present invention comprises a probability distribution calculation unit that, for each of events that occur in a target system of a service level agreement, calculates a probability distribution of a measured value of a service item included in the service level agreement, on the basis of event information relating to the event and of measured value information relating to the measured value; a probability calculation unit that refers to the probability distribution calculated by the probability distribution calculation unit and to an agreement threshold value of the service item, and that calculates, for each of the events, a probability that applies to a service level agreement breach and a probability that does not apply to the service level agreement breach; a probability density calculation unit that refers to the measured value information, and calculates a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and a breach occurrence probability calculation unit that, when the event occurs, calculates a probability that the agreement breach occurs within the predefined time after the occurrence of the event, by using the respective probabilities corresponding to the event and the respective probability densities corresponding to the measured values at a time of occurrence of the event.

The agreement breach prediction method of the present invention comprises a probability distribution calculation step of, for each of events that occur in a target system of a service level agreement, calculating a probability distribution of a measured value of a service item included in the service level agreement, on the basis of event information relating to the event and of measured value information relating to the measured value; a probability calculation step of referring to the probability distribution calculated in the probability distribution calculation step and to an agreement threshold value of the service item, and calculating, for each of the events, a probability that applies to a service level agreement breach and a probability that does not apply to the service level agreement breach; a probability density calculation step of referring to the measured value information, and calculating a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and a breach occurrence probability calculation step of, when the event occurs, calculating a probability that the agreement breach occurs within the predefined time after the occurrence of the event, by using the respective probabilities corresponding to the event and the respective probability densities corresponding to the measured values at a time of occurrence of the event.

The agreement breach prediction program of the present invention causes a computer to execute each step included in the abovementioned agreement breach prediction method.

The present invention allows enhancing prediction accuracy of service level agreement breaches.

DESCRIPTION OF THE DRAWINGS

FIG. 2 is a diagram illustrating examples of a learning event log and an inspection object event log;

FIG. 3 is a diagram illustrating examples of a learning SLA log and an inspection object SLA log;

FIG. 4 is a diagram illustrating an example of an event category list;

FIG. 5 is a diagram illustrating an example of a probability distribution table;

FIG. 6 is a diagram illustrating an example of a breach probability table;

FIG. 7 is a diagram illustrating, in tabular form, examples of various numerical values under an SLA according to which the response time of a service does not exceed 8 seconds;

FIG. 8 is a diagram illustrating an example of an SLA probability distribution table;

FIG. 13 is diagram for explaining a process in a correlation analysis unit;

FIG. 14 is a diagram illustrating an example of a correlation schedule;

FIG. 15 is a diagram illustrating an example of an event category list in the third embodiment; and FIG. 16 is a flowchart for explaining the operation of the agreement breach prediction system of the third embodiment.

DETAILED DESCRIPTION

Appropriate embodiments of the agreement breach prediction system, agreement breach prediction method and agreement breach prediction program according to the present invention are explained next with reference to accompanying drawings.

First Embodiment

Figure 1:
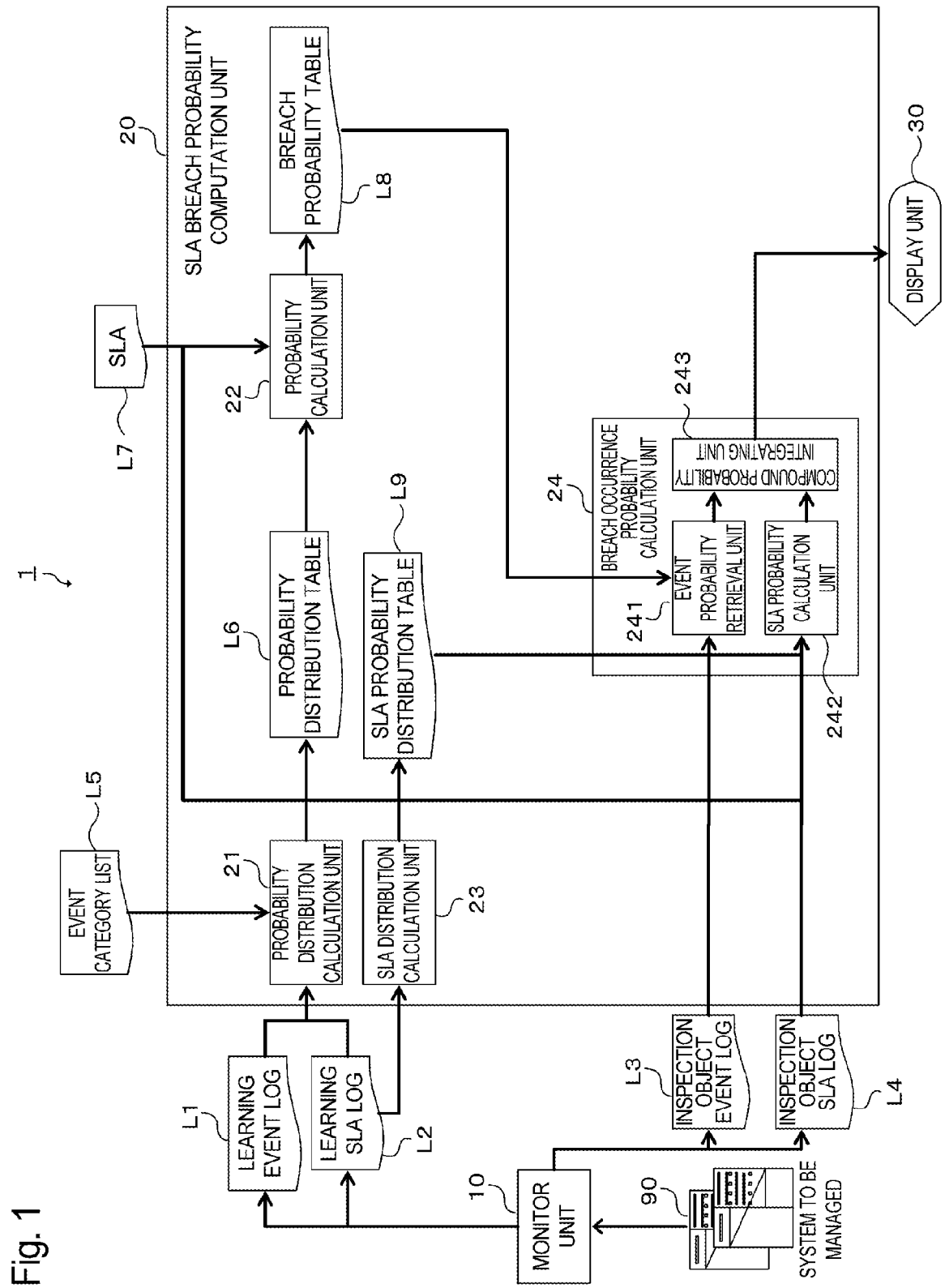
FIG. 1 is a block diagram illustrating an example of the configuration of an agreement breach prediction system in a first embodiment.

The configuration of an agreement breach prediction system in a first embodiment will be explained first with reference to FIG. 1. As illustrated in FIG. 1, an agreement breach prediction system 1 functionally has, for instance, a monitor unit 10, an SLA breach probability computation unit 20 and a display unit 30.

The agreement breach prediction system 1 is physically made up of, for instance, a CPU (Central Processing Unit), a memory, an input-output interface, and a display. The memory includes, for instance, a ROM (Read Only Memory) and HDD (Hard Disk Drive) that store programs and data processed by the CPU, and a RAM (Random Access Memory) that is mainly used as a work area for control processing. These elements are connected to each other by way of a bus. The CPU executes a program that is stored in the ROM, processes messages received via the input-output interface, and processes data deployed in the RAM, to realize as a result the various below-described functions of the agreement breach prediction system 1.

The monitor unit 10, which monitors the state of a system to be managed 90, generates various logs, for instance, a learning event log L1, a learning SLA log L2, an inspection object event log L3 and an inspection object SLA log L4. The system to be managed 90 is a system that is used by the service provider to provide a service to a customer, and is the system to which the SLA applies. The monitor unit 10 outputs log information every certain period of time (for instance, every 10 seconds).

The learning event log L1 and the inspection object event log L3 are logs that record event information relating to an event that the system to be managed 90 executes. FIG. 2 illustrates an example of the learning event log L1 and the inspection object event log L3. For instance, the learning event log L1 and the inspection object event log L3 record event information such as event occurrence time, event occurrence site (for instance, host device name), event message, event type and the like.

The learning SLA log L2 and the inspection object SLA log L4 are logs that record SLA measured value information relating to a measured value of an SLA service item at the time of event occurrence. Herein, an SLA service item denotes a service item included in the SLA, for instance response time. FIG. 3 illustrates an example of the learning SLA log L2 and the inspection object SLA log L4. For instance, the learning SLA log L2 and the inspection object SLA log L4 record SLA measured value information relating to, for instance, an event occurrence time and a measured value of an SLA service item.

The learning event log L1 and the learning SLA log L2 are logs for analysis and learning that are used for generating beforehand a probability distribution table L6 and an SLA probability distribution table L9 to be referred to upon prediction of the occurrence of an SLA breach. The inspection object event log L3 and the inspection object SLA log L4 are logs for feeding, to the agreement breach prediction system 1, events to be inspected and SLA measured values, upon prediction of the occurrence of an SLA breach.

The SLA breach probability computation unit 20 illustrated in FIG. 1 further has a probability distribution calculation unit 21, a probability calculation unit 22, an SLA distribution calculation unit 23, and a breach occurrence probability calculation unit 24.

The probability distribution calculation unit 21 refers to the learning event log L1, the learning SLA log L2 and the event category list L5, calculates a probability distribution of a measured value of an SLA service item at the time of event occurrence as recorded in the learning SLA log L2, for each event recorded in the learning event log L1, and stores the result in the probability distribution table L6. A normal distribution is used as the probability distribution in the present embodiment. The probability distribution calculation unit 21 calculates, as the probability distribution, a mean value and unbiased variance that allow uniquely identifying a normal distribution.

The event category list L5 is a list for determining the event category to which each event belongs. FIG. 4 illustrates an example of the event category list L5. For instance, the event category list L5 stores event categories and event types mapped to each other.

The probability distribution table L6 stores, for each event, a mean value and an unbiased variance that define a normal distribution. FIG. 5 illustrates an example of the probability distribution table L6. For each event being an event P, the probability distribution table L6 stores, mapped to each other, a mean value $E(p|P)$ and an unbiased variance $V(p|P)$ of an SLA measured value p. The "total" mean value and unbiased variance columns give the mean value $E(p)$ and unbiased variance $V(p)$ of all SLA measured values p, regardless of whether the event occurs or not.

An explanation follows next on a procedure for the calculation of the normal distribution of an event Pi by the probability distribution calculation unit 21. The probability distribution calculation unit 21 refers to the learning event log L1 and the learning SLA log L2, works then out, for each time t at which the event Pi occurs, a worst value $p_{worst}(t)$ of the SLA measured value p that is measured during the period of time from a time t at which the event Pi occurs until δt seconds (predefined time) have elapsed therefrom, and calculates a mean value E and an unbiased variance V of the worst value $p_{worst}(t)$.

For instance, a mean value $E(p_{worst}|Pi)$ and an unbiased variance $V(p_{worst}|Pi)$ of the worst value $p_{worst}(t)$ at $t_1, \ldots t_n$ points in time where the event Pi occurs can be calculated as follows.

$$E(p_{worst}|Pi) = (1/n)\Sigma_j p_{worst}(t_j) \qquad (1)$$

$$V(p_{worst}|Pi) = (1/n)\Sigma_j \{p_{worst}(t_j) - E(p_{worst}|Pi)\}^2 \qquad (2)$$

The square root of the unbiased variance V is the deviation σ, and hence the normal distribution $N\{E(p_{worst}|Pi), \sigma(p_{worst}|Pi)\}$ of the event Pi is uniquely determined. The "total" normal distribution N is $N\{E(p_{worst}), \sigma(p_{worst})\}$.

The probability calculation unit 22 illustrated in FIG. 1 refers to the probability distribution table L6 and the SLA list L7, calculates, for each event, a probability that applies to an SLA breach and a probability that does not apply to an SLA breach, and stores the results in a breach probability table L8.

The SLA list L7 stores, for each SLA service item, a threshold value that constitutes an agreement condition of the SLA service item. In a case where, for instance, the SLA states that the response time of the service should not exceed 8 seconds, then 8 seconds, which is the agreement threshold value, is stored in the SLA list L7 mapped to information that identifies the response time, which is the SLA service item.

The breach probability table L8 stores probabilities relating to SLA breaches. FIG. 6 illustrates an example of the breach probability table L8. The breach probability table L8 stores, mapped to each other, a probability $Pr(P_i|O)$ that the event $P_i$ occurs when an SLA breach has not occurred (represented herein by "O") within δt seconds (predefined time), and a probability $Pr(P_i|x)$ that the event $P_i$ occurs when an SLA breach has occurred within δt seconds (represented herein by "x"), for each event P. The breach probability table L8 stores, mapped to each other, a probability $Pr(O)$ that does not apply to an SLA breach, and a probability $Pr(x)$ that applies to an SLA breach, for the entire system.

The procedure according to which the probability calculation unit 22 calculates the above-described probabilities is explained next. The probability calculation unit 22 calculates in the manner described further on, a probability distribution that is specified on the basis of the probability distribution table L6, a non-breach probability $Pr(O)$ and a breach probability $Pr(x)$ for the entire system, and a non-breach probability $Pr(O|P_i)$ and a breach probability $Pr(x|P_i)$ for each event $P_i$ using an agreement threshold value $v_0$, of the SLA list L7. The probability distribution at the time of occurrence of the event $P_i$ is $N(E_i, \sigma_i)$.

$$Pr(O) = Pr\{p_{worst} < v_0 | N(E, \sigma)\} \qquad (3)$$

$$Pr(x) = Pr\{p_{worst} \geq v_0 | N(E, \sigma)\} \qquad (4)$$

$$Pr(O|P_i) = Pr\{p_{worst} < v_0 | N(E_i, \sigma)\} \qquad (5)$$

$$Pr(x|P_i) = Pr\{p_{worst} \geq v_0 | N(E_i, \sigma)\} \qquad (6)$$

The probability calculation unit 22 calculates $Pr(P_i|O)$ and $Pr(P_i|x)$ using $Pr(O|P_i)$ and $Pr(x|P_i)$ calculated in Expression (5) and Expression (6), in the manner described below.

$$Pr(P_i|O) = \{Pr(O|P_i) \times N_{Pi}\}/\{Pr(O) \times N_{all}\} \qquad (7)$$

$$Pr(P_i|x) = \{Pr(x|P_i) \times N_{Pi}\}/\{Pr(x) \times N_{all}\} \qquad (7)$$

In Expression (7) and Expression (8), $N_{Pi}$ is the number of times that the event $P_i$ occurs, and $N_{all}$ is the number of occurrences of all events.

The probability calculation unit 22 stores, in the breach probability table L8, the $Pr(O)$, $Pr(x)$, $Pr(P_i|O)$ and $Pr(P_i|x)$ calculated according to Expression (3), Expression (4), Expression (7) and Expression (8) above.

A specific example of the probabilities as calculated by the probability calculation unit 22 is explained next with reference to FIG. 7. FIG. 7 illustrates examples of various numerical value examples, under an SLA wherein the service response does not exceed 8 seconds. A probability $Pr(x|a)$ that event a entails an SLA breach (p>8) is given by Expression (9), wherein f(a) is the probability density of event a,

[Expression 1]

$$Pr(x|a) = \int_8^\infty f(a)dp \qquad (9)$$

The breach probability $Pr(x|a)$ of event a illustrated in FIG. 7 is "0.21". According to $Pr(O|a) = 1 - Pr(x|a)$, the non-breach probability $Pr(O|a)$ of event a is "0.79". The "total" column for $Pr(x|a)$ and $Pr(O|a)$ illustrated in FIG. 7 gives the breach probability $Pr(x)$ and non-breach probability $Pr(O)$ for the entire system, namely "0.21" and "0.79", respectively.

Since that the number of occurrences of the event a is 41, the expected value of the number of number of breaches of the event a is $41 \times Pr(x|a) = 41 \times 0.21 = 8.56$ times. The expected value of the number of breach occurrences in the entire system is $229 \times Pr(x) = 229 \times 0.21 = 48.19$ times, since the number of event occurrences for the entire system is 229. Accordingly, there holds $Pr(a|x) = 8.56/48.19 = 0.17$. Likewise, there holds $Pr(a|O) = 32.44/179.80 = 0.18$.

The SLA distribution calculation unit 23 illustrated in FIG. 1 refers to the learning SLA log L2, calculates a probability distribution of the SLA measured value that applies to the SLA breach, during a period of time from event occurrence until δt seconds have elapsed, and a probability distribution of the SLA measured value that does not apply to an SLA breach, during a period of time from event occurrence until δt seconds have elapsed, and stores the results in the SLA probability distribution table L9. In the present embodiment a normal distribution is used as the probability distributions. Therefore, the SLA distribution calculation unit 23 calculates, as each probability distribution, a mean value and an unbiased variance that allow uniquely identifying a normal distribution. The probability density can be uniquely specified if the probability distribution is defined.

The SLA probability distribution table L9 stores the mean value and the unbiased variance that specify the normal distribution of an SLA measured value for instances that apply to an SLA breach, and for instances that do not apply to an SLA breach, during a period of time from event occurrence until δt seconds have elapsed. FIG. 8 illustrates an example of the SLA probability distribution table L9. The SLA probability distribution table L9 stores a mean value $E(p|O)$ and a unbiased variance $V(p|O)$ of the SLA measured value p for an instance that does not apply to an SLA breach, during a period of time from event occurrence until δt seconds have elapsed, and a mean value $E(p|x)$ and a unbiased variance $V(p|x)$ of the SLA measured value p for an instance that applies to an SLA breach, during a period of time from event occurrence until δt seconds have elapsed. The values in the SLA probability distribution table L9 illustrated in FIG. 8 are examples of numerical values for a hypothetical instance where the value of the SLA measured value p(t) is "6".

An explanation follows next on the procedure according to which the SLA distribution calculation unit 23 calculates the mean value and the unbiased variance, which are a normal distribution. For instance, a mean value $E_O$ and an unbiased variance $V_O$ of the SLA measured value p(t) can be calculated as described below, wherein points in time at which no SLA breach occurs until δt seconds have elapsed are $t_1, \ldots, t_n$, and p(t) is the SLA measured value.

$$E_O = (1/n)\Sigma_j p(t_j) \quad (10)$$

$$V_O = (1/n)\Sigma_j \{p(t_j) - E\}^2 \quad (11)$$

The square root of the unbiased variance $V_O$ yields a deviation $\sigma_O$. Therefore, a normal distribution $N\{E_O, \sigma_O\}$ is uniquely determined, and a probability density f(p|O) is likewise uniquely determined. A normal distribution $N\{E_x, \sigma_x\}$ and a probability density f(p|x) can be calculated in the same manner.

The breach occurrence probability calculation unit 24 illustrated in FIG. 1 calculates a probability that, when the event P has occurred, an agreement breach occurs within δt seconds from occurrence of the event P, using the probabilities Pr(O), Pr(x), Pr(P|O), Pr(P|x) corresponding to the event P, and probability densities f(p|O) and f(p|x) corresponding to an SLA measured value p at the time of occurrence of the event P. The breach occurrence probability calculation unit 24 comprises an event probability retrieval unit 241, an SLA probability calculation unit 242 and a compound probability integrating unit 243.

The event probability retrieval unit 241 detects, on the basis of the breach probability table L8, various probabilities corresponding to the events included in the inspection object event log L3. In a case where, for instance, event $P_i$ and event $P_j$ occur simultaneously, the event probability retrieval unit 241 detects $Pr(P_i|O)$, $Pr(P_j|O)$, Pr(O), $Pr(P_i|x)$, $Pr(P_j|x)$ and Pr(x) from the breach probability table L8.

The SLA probability calculation unit 242 reads a value v of the SLA measured value p(t) at a current point in time t, from the inspection object SLA log L4, and calculates probability densities f(p(t)=v|O) and f(p(t)=v|x) by referring to the SLA probability distribution table L9. Specifically, for instance, in the case of the SLA probability distribution table L9 illustrated in FIG. 8, a probability density f(p(t)=6|O) is calculated by working out a probability density of a normal distribution for which the value of the SLA measured value p(t) is "6", the mean value is "2.86" and the unbiased variance is "10.71". Likewise, a probability density f(p(t)=6|x) is calculated by working out the probability density of a normal distribution having a mean value of "10.26" and an unbiased variance of "3.49".

The compound probability integrating unit 243 calculates a probability Pr(x|p(t)=v,P) of an SLA breach at a time where the value of the SLA measured value p(t) at the current time t is v, and one or a plurality of events P occurs, using the various probabilities detected by the event probability retrieval unit 241 and the probability densities calculated by the SLA probability calculation unit 242.

In a case where, for instance, there occur the event $P_i$, the event $P_j$, and an event for which the value of the SLA measured value p(t) falls between v to v+δv (for instance, event p), then an SLA breach probability $Pr(x|P_i, P_j, p)$ can be calculated as described below, according to the known Bayes' theorem and $\lim_{\delta v \to 0} Pr(p)/\delta v = f(p)$.

$$Pr(x \mid P_i, P_j, p) = Pr(P_i, P_j, p \mid x)Pr(x)/Pr(P_i, P_j, p) = \quad (12)$$

$$Pr(P_i \mid x)Pr(P_j \mid x)Pr(p \mid x)Pr(x)/Pr(P_i, P_j, p) =$$

$$Pr(P_i \mid x)Pr(P_j \mid x)Pr(p \mid x)$$

$$Pr(x)/\{Pr(O)Pr(P_i \mid O)Pr(P_j \mid O)Pr(p \mid O) +$$

$$Pr(x)Pr(P_i \mid x)Pr(P_j \mid x)Pr(p \mid x)\} =$$

$$Pr(P_i \mid x)Pr(P_j \mid x)\{Pr(p \mid x)/\delta p\}$$

$$Pr(x)/\{Pr(O)Pr(P_i \mid O)Pr(P_j \mid O)\{Pr(p \mid O)/\delta v\} +$$

$$Pr(x)Pr(P_i \mid x)Pr(P_j \mid x)\{Pr(p \mid x)/\delta p\}\} =$$

$$\lim_{(\delta v \to 0)} \{Pr(P_i \mid x)Pr(P_j \mid x)\{Pr(p \mid x)/\delta p\}$$

$$Pr(x)/\{Pr(O)Pr(P_i \mid O)Pr(P_j \mid O)\{Pr(p \mid O)/\delta v\} +$$

$$Pr(x)Pr(P_i \mid x)Pr(P_j \mid x)\{Pr(p \mid x)/\delta p\}\} =$$

$$Pr(P_i \mid x)Pr(P_j \mid x)f(p \mid x)Pr(x)/$$

$$\{Pr(O)Pr(P_i \mid O)Pr(P_j \mid O)f(p \mid O) +$$

$$Pr(x)Pr(P_i \mid x)Pr(P_j \mid x)f(p \mid x)\}$$

Expression (12) is an expression where both event $P_i$ and event $P_j$ occur; however, the portions "$P_j$" may be omitted from the various terms in Expression (12), in cases where, for instance, only the event $P_i$ occurs.

Specifically, in a case where, for instance, event a and event b occur within 5 minutes, which is a given time interval, and the value of the SLA measured value p(t) at that time is "6", then there is worked out a probability Pr(x|Pa, Pb, p=6) of an SLA breach within 5 minutes. The computation in this case can be carried out as described below using Expression (12).

$$Pr(x \mid Pa, Pb, p = 6) = Pr(Pa \mid x)Pr(Pb \mid x)f(p = 6 \mid x) \quad (13)$$

$$Pr(x)/\{Pr(O)Pr(Pa \mid O)Pr(Pb \mid O)f(p = 6 \mid O) +$$

$$Pr(x)Pr(Pa \mid x)Pr(Pb \mid x)f(p = 6 \mid x)\}$$

Herein, Pr(Pa|x)="0.17", Pr(Pb|x)="0.24", f(p=6|x)="0.0158", Pr(x)="0.21", Pr(Pa|O)="0.18", Pr(Pb|O)="0.26", f(p=6|O)="0.0769" and Pr(O)="0.79", as examples of the numerical values of the breach probability table L8 of FIG. 6 and the SLA probability distribution table L9 of FIG. 8, are substituted in Expression (13), to yield Pr(x|Pa, Pb, p=6)="0.00363".

The present embodiment assumes the following premises.

Premise 1: $pr(x|P_1, \ldots, P_n)$ are identical regardless of time t.

Premise 2: events $P_1, \ldots, P_n$ are stochastically independent, in conditional probability having SLA breach negative (O) or SLA breach affirmative (x) as a condition. Accordingly, there hold $Pr(P_m, P_n|O) = Pr(P_m|O)Pr(P_n|O)$ and $Pr(P_m, P_n|x) = Pr(P_m|x)Pr(P_n|x)$.

Premise 3: the probability density of the value of SLA measured value p(t) obeys a specific probability distribution, and the type of the probability distribution (for instance, normal distribution) is known beforehand. In a simple Bayesian filter, as is known, premise 2 often holds approximately.

Premise 4: the event $P_i$, and presence of the value of the SLA measured value p(t) from v to δv, are stochastically independent, in conditional probability having SLA breach negative (O) or SLA breach affirmative (x) as a condition. Accordingly, there hold $Pr(P_i, v \le p(t) < v + \delta t | O) = Pr(P_i|O)Pr(v \le p(t) < v + \delta t | O)$ and $Pr(P_i, v \le p(t) < v + \delta | x) = Pr(P_i|x)Pr(v \ge p(t) < v + \delta t | x)$.

Premise 5: the probability density of the value of the SLA measured value p(t) obeys a specific probability distribution, and the type of the probability distribution (for instance, normal distribution), is known beforehand, in conditional probability having SLA breach negative (O) or SLA breach affirmative (x) as a condition.

Figure 9:
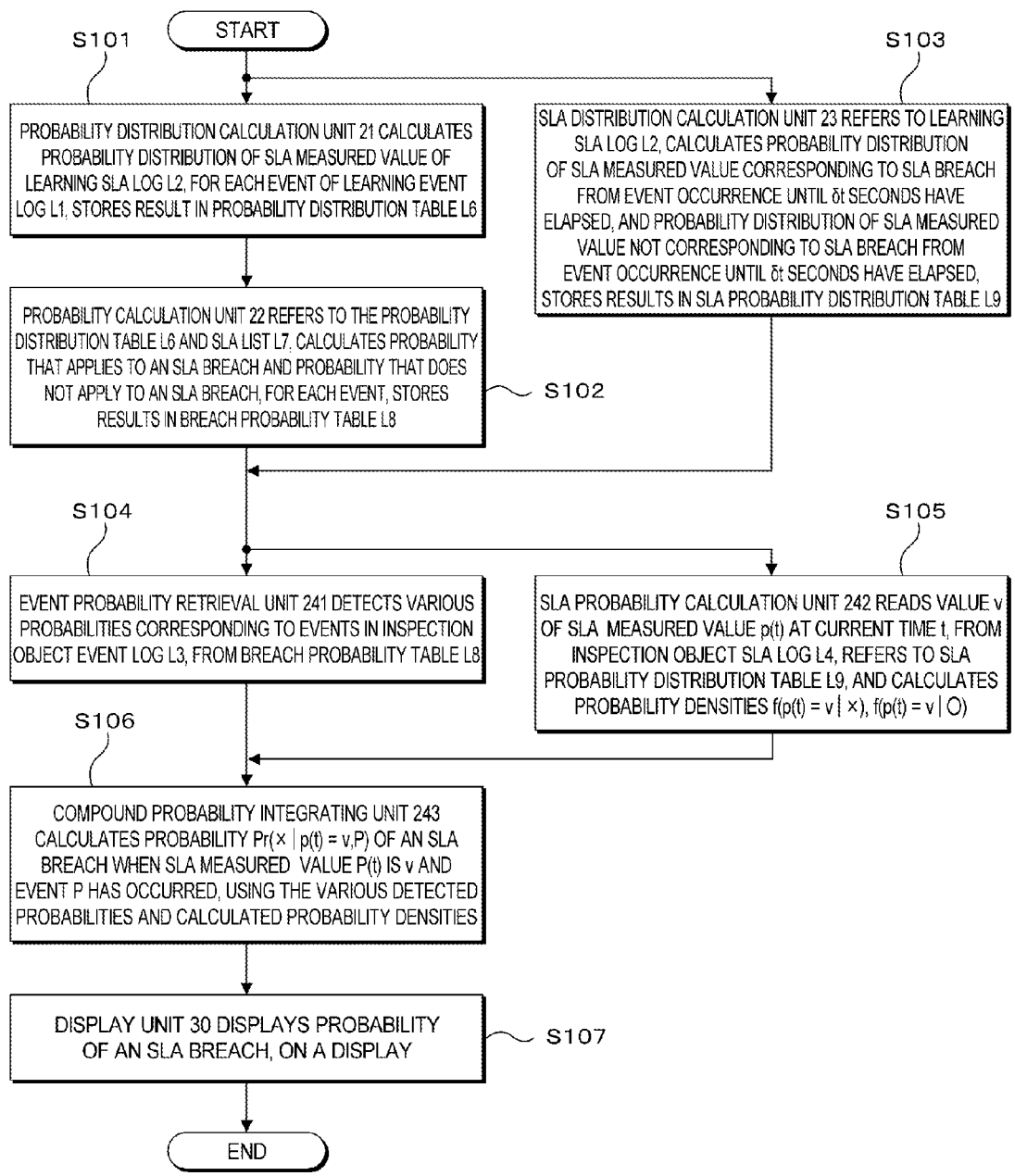
FIG. 9 is a flowchart for explaining the operation of the agreement breach prediction system of the first embodiment.

The operation of the agreement breach prediction system 1 of the first embodiment will be explained next with reference to FIG. 9. The operation explained below assumes that the monitor unit 10 monitors the state of the system to be managed 90, and that the various logs, for instance the learning event log L1, learning SLA log L2, inspection object event log L3, inspection object SLA log L4 and so forth are generated beforehand.

Firstly, the probability distribution calculation unit 21 refers to the learning event log L1, the learning SLA log L2 and the event category list L5, and for each event recorded in the learning event log L1, calculates a probability distribution of the measured value of the SLA service item that is recorded in the learning SLA log L2, and stores the result in the probability distribution table L6 (step S101).

Next, the probability calculation unit 22 refers to the probability distribution table L6 and the SLA list L7 updated in step S101, and, for each event, calculates a probability that applies to an SLA breach, and a probability that does not apply to an SLA breach, and stores the results in the breach probability table L8 (step S102).

The SLA distribution calculation unit 23 refers to the learning SLA log L2, calculates a probability distribution corresponding to an SLA measured value that applies to an SLA breach, during a period of time from event occurrence until δt seconds have elapsed, and a probability distribution corresponding to an SLA measured value that does not apply to an SLA breach, during a period of time from event occurrence until δt seconds have elapsed, and stores the results in the SLA probability distribution table L9 (step S103).

The process in step S101 and step S102 may be executed in parallel to the process of step S103, or any one of the processes may be executed first, and the other processes thereafter. The processes from step S101 to step S103 are preparatory processes that are executed before operation of the system. The processes from step S104 onwards are operation processes that are carried out during operation of the system.

Next, during system operation, the event probability retrieval unit 241 detects, on the basis of the breach probability table L8, various probabilities corresponding to the events included in the inspection object event log L3 (step S104).

The SLA probability calculation unit 242 reads a value v of the SLA measured value p(t) at a current time t, from the inspection object SLA log L4, and calculates the probability densities f(p(t)=v|O) and f(p(t)=v|x) by referring to the SLA probability distribution table L9 (step S105).

Herein, the process in step S104 and the process in step S105 may be executed in parallel, or any one of the processes may be executed first, and the other process thereafter.

Next, the compound probability integrating unit 243 calculates the probability Pr(x|p(t)=v,P) of an SLA breach at a time where the value of the SLA measured value p(t) is v at the current time t, and one or a plurality of events P occurs, using the various probabilities detected in step S104 and the probability densities calculated in step S105 (step S106).

Next, the display unit 30 displays the probability of SLA breach, as calculated in step S106, on a display (step S107).

In the agreement breach prediction system 1 of the first embodiment, as described above, a probability distribution, calculated on the basis of data that is stored in the learning event log L1 and the learning SLA log L2, is stored in a probability distribution table, and the probability of an SLA breach can be predicted on the basis of this probability distribution table. The accuracy of prediction can be enhanced as a result.

A probability distribution of whether or not an SLA breach occurs over a period of time since occurrence of an event until δt seconds have elapsed therefrom, is stored in an SLA probability distribution table, and the probability of an SLA breach within δt seconds can be predicted, using a current SLA measured value as a criterion, on the basis of the SLA probability distribution table. Therefore, predictions can be performed with yet higher accuracy.

Second Embodiment

Figure 10:
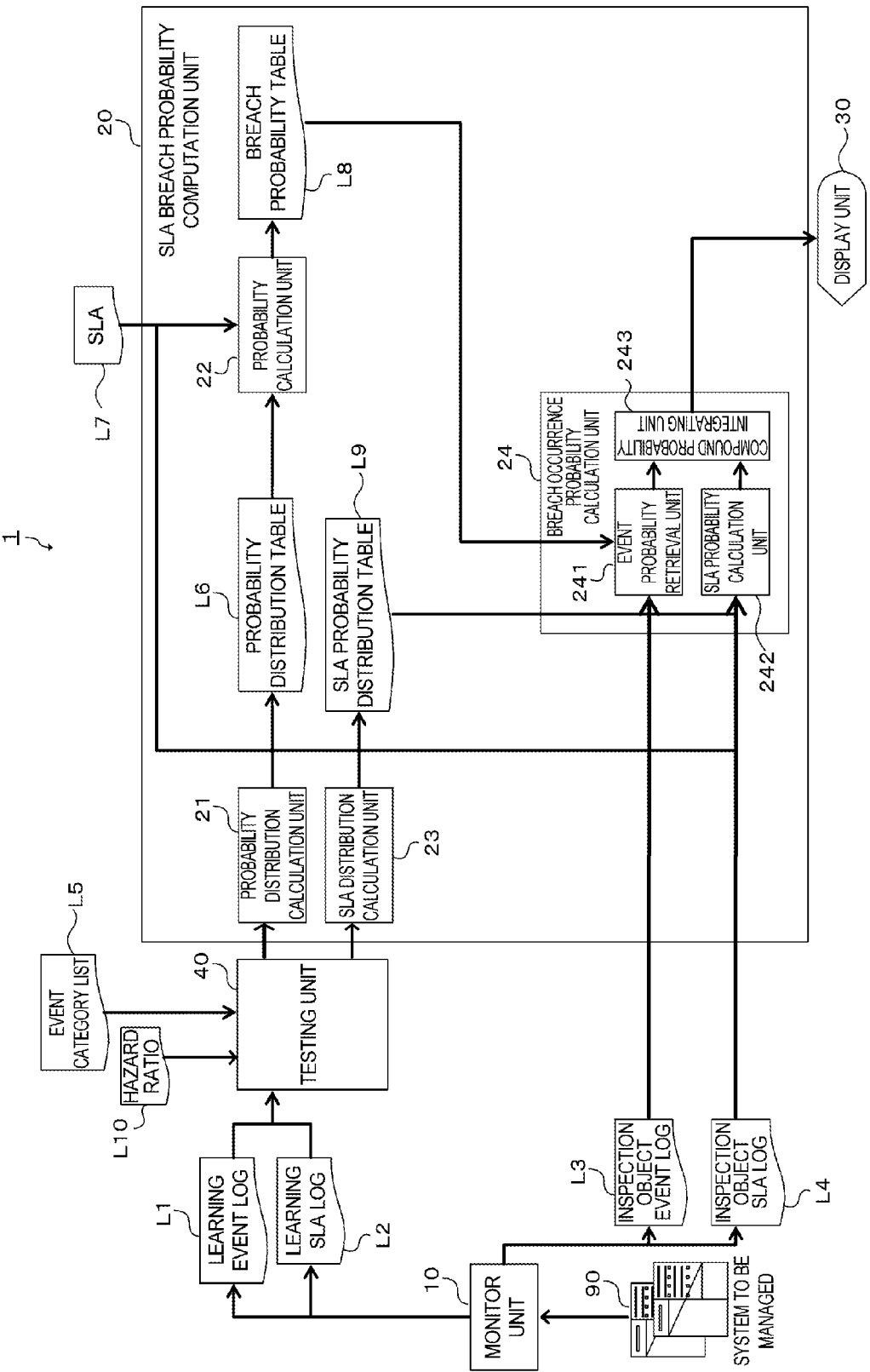
FIG. 10 is a block diagram illustrating an example of the configuration of an agreement breach prediction system in a second embodiment.

An explanation follows next on a second embodiment of the present invention. The agreement breach prediction system 1 in a second embodiment illustrated in FIG. 10 differs from the agreement breach prediction system 1 of the first embodiment described above in that a testing unit 40 and a hazard ratio list L10 have been now added. Other features are identical to those of the agreement breach prediction system 1 of the first embodiment, and hence the various constituent elements will be denoted by identical reference numerals, and an explanation thereof will be omitted. The explanation below refers mainly to differences with respect to the first embodiment.

The testing unit 40 tests, for each event, whether the probability distribution calculated by the probability distribution calculation unit 21 and the probability distribution calculated by the SLA distribution calculation unit 23 are normal distributions or not. For instance, a known chi-squared test can be used as the test method. Specifically, the testing unit 40 calculates a significance probability of the probability distributions to be tested, and if the calculated significance probability is greater than a hazard ratio (for instance, 0.05) set in the hazard ratio list L10, then the probability distribution is determined to be a normal distribution.

The testing unit 40 sets, as input targets for the probability distribution calculation unit 21 and the SLA distribution calculation unit 23, only those events corresponding to a probability distribution that has been tested to be a normal distribution. Specifically, the testing unit 40 establishes a use flag at a record of the event category list L5 corresponding to the event that has been tested to be of normal distribution. The probability distribution calculation unit 21 and the SLA distribution calculation unit 23 set, as process targets, only those events for which a use flag is established in the event category list L5. As a result, there can be set, as input targets of the probability distribution calculation unit 21 and the SLA distribution calculation unit 23, only those events corresponding to a probability distribution that has been tested to be a normal distribution.

Figure 11:
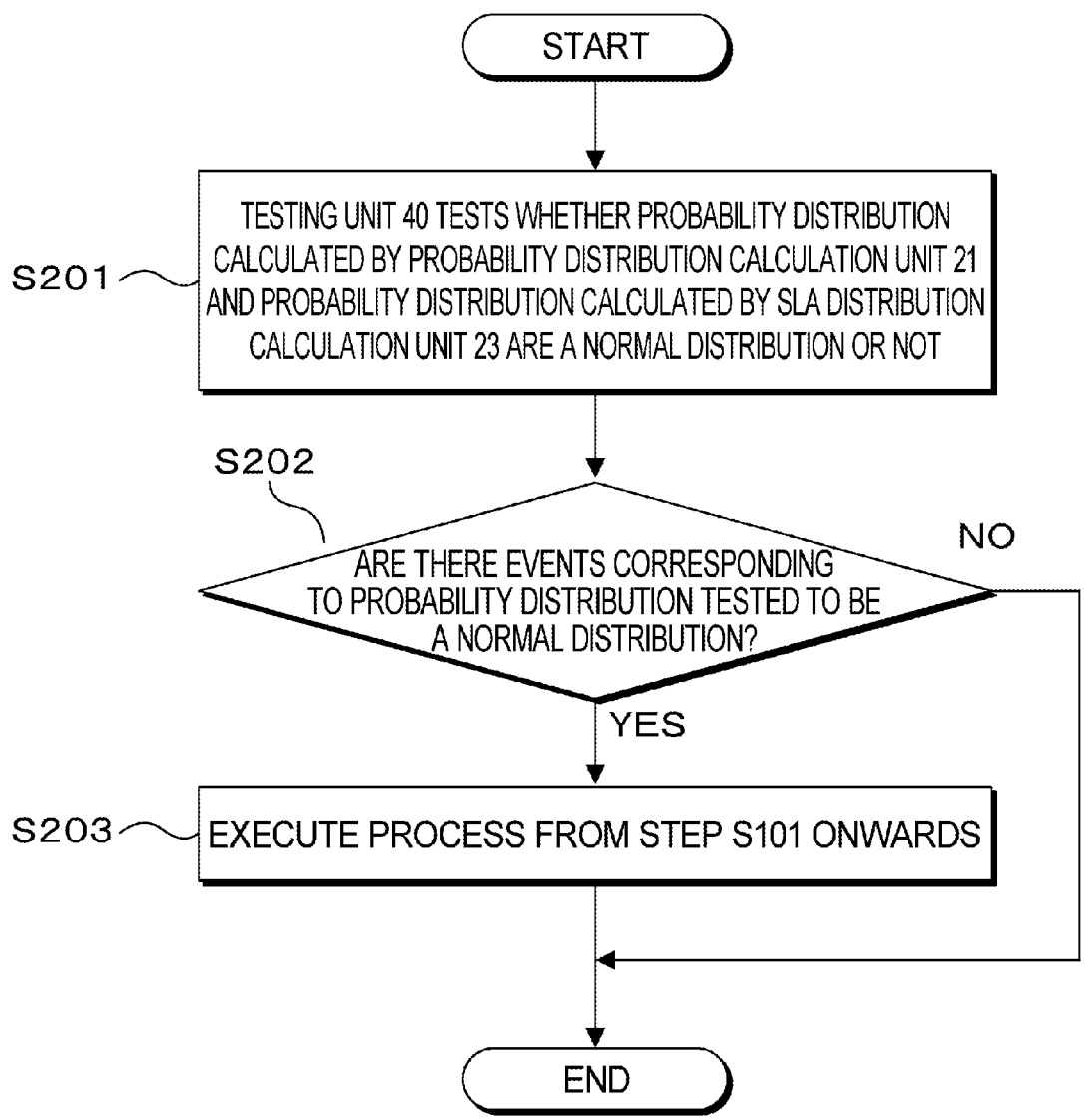
FIG. 11 is a flowchart for explaining the operation of the agreement breach prediction system of the second embodiment.

The operation of the agreement breach prediction system 1 of the second embodiment will be explained next with reference to FIG. 11. In the operation explained below, it is assumed, as in the first embodiment, that the learning event log L1, the learning SLA log L2, the inspection object event log L3 and the inspection object SLA log L4 are generated beforehand.

Firstly, the testing unit 40 tests, for each event, whether the probability distributions calculated by the probability distribution calculation unit 21 and the probability distributions calculated by the SLA distribution calculation unit 23 are normal distributions or not (step S201).

Next, the testing unit 40 determines whether or not there exists an event that corresponds to a probability distribution that has been tested to be a normal distribution (step S202). If the determination is NO (step S202; NO), the process is terminated.

If in the determination of step S202 it is determined that an event exists that corresponds to the probability distribution that is tested to be a normal distribution (step S202; YES), then the process from the above-described step S101 (FIG. 9)

onwards is executed only for those events for which a use flag is established in the event category list L5 (step S203).

As described above, the agreement breach prediction system 1 of the second embodiment can check whether a relationship between events in the system to be managed 90 and SLA measured values, and a relationship between an SLA measured value and a worst value of the SLA measured value within δt seconds, are as expected or not. Noise can be eliminated, and the prediction accuracy of SLA breaches can be enhanced by excluding thus unexpected events.

Third Embodiment

An explanation follows next on a third embodiment of the present invention. The agreement breach prediction system 1 of the third embodiment illustrated in FIG. 12 differs from the agreement breach prediction system 1 of the first embodiment described above in that now a correlation analysis unit 50, an event category filter unit 51 and a correlation schedule L11 are supplementarily provided. Other features are identical to those of the agreement breach prediction system 1 of the first embodiment, and hence the various constituent elements will be denoted by identical reference numerals, and an explanation thereof will be omitted. The explanation below refers mainly to differences with respect to the first embodiment.

The correlation analysis unit 50 calculates a degree of correlation between events, as follows. Firstly, the correlation analysis unit 50 calculates a vector of the occurrence of each event. In the case, for instance, of the event Pi, a vector of the occurrence of event Pi is $P_{O,i}=(Pi(t_{O,1}), \ldots, Pi(t_{O,n}))$ where $t_{O,1}, \ldots, t_{O,n}$ are the points in time by which an SLA breach has not occurred until δt seconds have elapsed. Herein, $Pi(t_i)$ is 1 in a case where the event Pi has occurred, and 0 in a case where the event Pi has not occurred.

Specifically, the correlation analysis unit 50 uses the learning event log L1 and the learning SLA log L2 as inputs, and every 5 minutes, generates an SLA measured value, a worst value of the SLA measured value in 5 minutes, and information on events occurred in 5 minutes, as in the table illustrated in FIG. 13. As the information on events that have occurred in 5 minutes, "1" is stored in a case where the event has occurred in 5 minutes and "0" is stored in a case where the event has not occurred in 5 minutes, for each event.

Next, the correlation analysis unit 50 calculates respective correlation coefficients k between events. Herein, Pearson's product-moment correlation coefficients can for instance be used as the correlation coefficients k. In this case, the correlation coefficients are worked out by calculating $k_{i,j}=(Pi-k_i*n)\cdot(Pj-k_j*n)/|Pi-k_i*n||Pj-k_j*n|$. The correlation analysis unit 50, for instance, calculates $k_{Oi-j}=P_{O,i}\cdot P_{O,i}/||P_{O,i}||P_{O,i}|$ and $k_{xi-j}=P_{x,i}\cdot P_{x,i}/||P_{x,i}||P_{x,i}|$ as the correlation coefficients $k_{i-j}$ of Pi and Pj. Herein, $P_i\cdot P_j$ is the inner product, and $|P_i|$ is the vector length. In FIG. 13, Pc=(0, 1, 0, 0, 1, ...) and Pd=(0, 1, 1, 0, 0, ...). Therefore, the correlation analysis unit 50 calculates, for instance, $k_{Oc,d}=-0.17$, and calculates $k_{xc,d}=-0.25$" using the foregoing values. The correlation analysis unit 50 stores the calculated correlation coefficients between events in a correlation schedule L11 illustrated in FIG. 14(A) and FIG. 14(B).

Next, the correlation analysis unit 50 calculates a vector $\delta p=(\delta p(t_1), \ldots, \delta p(t_n))$ of $\delta p(t)=p_{worst}(t)-p(t)$ represented by the difference between an SLA measured value p(t) at time t and the worst value $p_{worst}(t)$ of the SLA measured value in the period from time t up to δt.

Next, the correlation analysis unit 50 calculates correlation coefficients $k_{i,\delta p}$ between respective events Pi and δp(t). The Pearson's product-moment correlation coefficient can for instance be used as the correlation coefficient. In such a case, the correlation coefficients can be worked out by calculating $k_{i,\delta p}=(Pi-k_i*n)\cdot(\delta p-k_{\delta p}*n)/|Pi-k_i*n||\delta p-k_{\delta p}*n|$. Herein, n is (1, 1, ..., 1), $k_i$ is the mean value $(1/n)\Sigma_j c_{i,j}$ of $Pi=(c_{i,1}, c_{i,2}, \ldots, c_{i,n})$, and $k_{\delta p}$ is the mean value $(1/n)\Sigma_j d_{i,j1}$ of δp=(d1, d2, ..., dn). In FIG. 13, Pc=(0, 1, 0, 0, 1, ...) and δp=(6.65-7.22, 8.52-8.08, 10.79-10.08, ...). Therefore, the correlation analysis unit 50 calculates, for instance, $k_{c,\delta p}=0.04$ using the foregoing values. The correlation analysis unit 50 stores the respective calculated correlation coefficients $k_{i,\delta p}$ in the correlation schedule L11 illustrated in FIG. 14(C).

Figure 12:
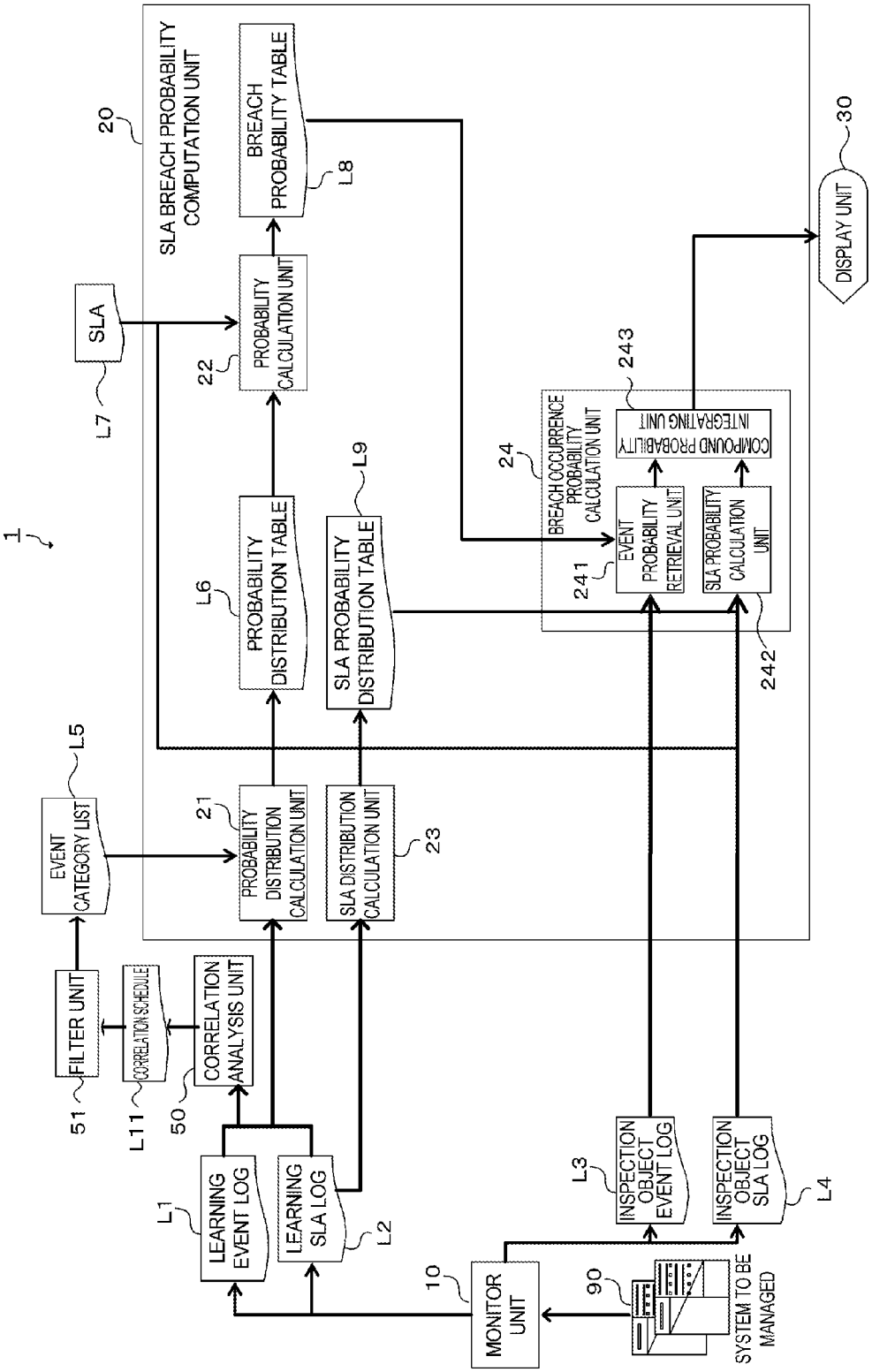
FIG. 12 is a block diagram illustrating an example of the configuration of an agreement breach prediction system in a third embodiment.

The event category filter unit 51 illustrated in FIG. 12 refers to the correlation schedule L11 illustrated in FIG. 14(C), determines that an event having a low interconnectedness with δp(t) as a event that exerts little influence on the SLA measured value, and rules out the event from candidates in an event category list. Whether or not interconnectedness is low can be determined, for instance, on the basis of whether or not $|k_{i,\delta p}|$ is smaller than "0.005". In the correlation schedule L11 illustrated in FIG. 14(C), all $|k_{i,\delta p}|$ are equal to or greater than "0.005". Therefore, no events are ruled out.

The event category filter unit 51 refers to the correlation schedule L11 illustrated in FIG. 14(A) and FIG. 14(B), and rules out, from candidates of the event category list, any one event from among events having high interconnectedness between events. Whether or not interconnectedness is high can be determined, for instance, on the basis of whether or not $|k_{i,j}|$ exceeds "0.5". In the correlation schedule L11 illustrated in FIG. 14(A) and FIG. 14(B), all $|k_{i,j}|$ are no greater than "0.5", and hence no events are ruled out. If there exist events of high interconnectedness, then, for instance, events having low interconnectedness with δp(t) can be ruled out from candidates in the event category list.

The event category filter unit 51 outputs, for instance, the event category list L5 illustrated in FIG. 15. The event category list L5 illustrated in FIG. 15 indicates that events a, b, c, d and f, for which a flag (check mark) is established in the use flag column, are "events not ruled out", and indicates that event e for which no flag is established in the use flag column, is a "ruled-out event".

The operation of the agreement breach prediction system 1 of the third embodiment will be explained next with reference to FIG. 16. In the operation explained below, it is assumed, as in the first embodiment, that the learning event log L1, the learning SLA log L2, the inspection object event log L3 and the inspection object SLA log L4 are generated beforehand.

Firstly, the correlation analysis unit 50 calculates correlation coefficients between δp(t) and the events that have occurred in the system to be managed 90, and stores the results in the correlation schedule L11 (step S301).

Next, the correlation analysis unit 50 calculates correlation coefficients between respective events that have occurred in the system to be managed 90, and stores the results in the correlation schedule L11 (step S302).

Next, the event category filter unit 51 rules out, from candidates in the event category list, those events for which interconnectedness with δp(t) is smaller than a first predefined threshold value (for instance, 0.005) (step S303).

Next, the event category filter unit 51 rules out, from the candidates in the event category list, events having low interconnectedness with δp(t), from among events for which the interconnectedness between events exceeds a second predefined threshold value (for instance, 0.5) (step S304).

Next, the event category filter unit 51 outputs the event category list L5 (step S305).

Next, the SLA breach probability computation unit 20 determines whether or not an event exists for which a use flag is established in the event category list L5 (step S306). If the determination is NO (step S306; NO), the process is terminated.

By contrast, if in step S306 it is determined that an event exists for which a use flag is established (step S306; YES), then the process from the above-described step S101 (FIG. 9) onwards is executed only for those events for which a use flag is established in the event category list L5 (step S307).

As described above, the device 1 of the third embodiment allows ruling out events having low interconnectedness with δp(t), and allows predicting SLA breaches by targeting only events having high interconnectedness with δp(t). Events that do not influence service quality can be ruled out thereby, and hence the prediction accuracy of SLA breaches can be enhanced.

Also, it becomes possible to rule out one of the events from among events having high interconnectedness between events. The present invention assumes that event occurrences are stochastically independent. Therefore, prediction accuracy of SLA breaches can be enhanced by ruling out one of the events in a case where there exist events of high stochastic dependence.

Variations

The above-described embodiments are merely exemplary in nature, and do not exclude various modifications and technical applications that have not been explicitly set forth in the embodiments. That is, the present invention can be carried out in the form of all manner of embodiment variations without departing from the scope of the invention.

For instance, part or the entirety of the above embodiments can be described according to the appendices set forth below, but the present invention is not limited thereto.

(Supplementary note 1) An agreement breach prediction system, comprising: a probability distribution calculation unit that, for each of events that occur in a target system of a service level agreement, calculates a probability distribution of a measured value of a service item included in the service level agreement, on the basis of event information relating to the event and of measured value information relating to the measured value; a probability calculation unit that refers to the probability distribution calculated by the probability distribution calculation unit and to an agreement threshold value of the service item, and that calculates, for each of the events, a probability that applies to a service level agreement breach and a probability that does not apply to the service level agreement breach; a probability density calculation unit that refers to the measured value information, and calculates a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and a breach occurrence probability calculation unit that, when the event occurs, calculates a probability that the agreement breach occurs within the predefined time after the occurrence of the event, by using the respective probabilities corresponding to the event and the respective probability densities corresponding to the measured values at a time of occurrence of the event.

(Supplementary note 2) The agreement breach prediction system according to Supplementary note 1, further comprising a testing unit that tests whether the probability distribution calculated by the probability distribution calculation unit is a predefined distribution or not, wherein the probability distribution calculation unit calculates the probability distribution on the basis of the measured value information and the event information corresponding to the probability distribution having been determined to be the predefined distribution by the testing unit.

(Supplementary note 3) The agreement breach prediction system according to Supplementary note 1 or 2, further comprising: a correlation coefficient calculation unit that refers to the measured value information, and calculates, for each of the events, a first correlation coefficient between a measured value at the time of occurrence of the event and a change value of the measured value in a period of time from occurrence of the event until a predefined time has elapsed; and a filter unit that excludes, from targets of the event information, the event for which the first correlation coefficient calculated by the correlation coefficient calculation unit is smaller than a predefined threshold value.

(Supplementary note 4) The agreement breach prediction system according to Supplementary note 3, further comprising: a second correlation coefficient calculation unit that refers to the event information and calculates a second correlation coefficient between the respective events; and a second filter unit that excludes, from the targets of the event information, the event for which the first correlation coefficient calculated by the correlation coefficient calculation unit is the smaller, from among the two events corresponding to the second correlation coefficient, in a case where the second correlation coefficient calculated by the second correlation coefficient calculation unit is greater than a second predefined threshold value.

(Supplementary note 5) The agreement breach prediction system according to any one of Appendices 1 to 4, wherein the probability distribution is a normal distribution.

(Supplementary note 6) An agreement breach prediction method, comprising: a probability distribution calculation step of, for each of events that occur in a target system of a service level agreement, calculating a probability distribution of a measured value of a service item included in the service level agreement, on the basis of event information relating to the event and of measured value information relating to the measured value; a probability calculation step of referring to the probability distribution calculated in the probability distribution calculation step and to an agreement threshold value of the service item, and calculating, for each of the events, a probability that applies to a service level agreement breach and a probability that does not apply to the service level agreement breach; a probability density calculation step of referring to the measured value information, and calculating a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and a breach occurrence probability calculation step of, when the event occurs, calculating a probability that the agreement breach occurs within the predefined time after the occurrence of the event, by using the respective probabilities corresponding to the event and the respective probability densities corresponding to the measured values at a time of occurrence of the event.

(Supplementary note 7) An agreement breach prediction program for causing a computer to execute each step described in Supplementary note 6.

The present application claims priority on the basis of Japanese Patent Application No. 2010-132300, filed on Jun. 9, 2010, the entire content whereof is incorporated herein by reference.

The agreement breach prediction system, agreement breach prediction method and agreement breach prediction program according to the present invention are appropriate for improving the prediction accuracy of service level agreement breaches.

1 . . . agreement breach prediction system; 10 . . . monitor unit; 20 . . . SLA breach probability computation unit; 21 . . . probability distribution calculation unit; 22 . . . probability calculation unit; 23 . . . SLA distribution calculation unit; 24 . . . breach occurrence probability calculation unit; 241 . . . event probability retrieval unit; 242 . . . SLA probability calculation unit; 243 . . . compound probability integrating unit; 30 . . . display unit; 40 . . . testing unit; 50 . . . correlation analysis unit; 51 . . . event category filter unit; 90 . . . system to be managed; L1 . . . learning event log; L2 . . . learning SLA log; L3 . . . inspection object event log; L4 . . . inspection object SLA log; L5 . . . event category list; L6 . . . probability distribution table; L7 . . . SLA list; L8 . . . breach probability table; L9 . . . SLA probability distribution table; L10 . . . hazard ratio list; L11 . . . correlation schedule.

What is claimed is:

1. An agreement breach prediction system, comprising:
a correlation coefficient calculation unit that refers to the measured value information for analysis and learning relating to a measured value of a service item included in a service level agreement, and calculates, for each event that occurs in a target system of a service level agreement, a first correlation coefficient between a measured value at the time of occurrence of the event and a change value of the measured value in a period of time from occurrence of the event until a predefined time has elapsed;
a filter unit that excludes, from targets of event information for analysis and learning relating to the event, the event for which the first correlation coefficient calculated by the correlation coefficient calculation unit is smaller than a predefined threshold value;
a second correlation coefficient calculation unit that refers to the event information and calculates a second correlation coefficient between the respective events;
a second filter unit that excludes, from the targets of the event information, the event for which the first correlation coefficient calculated by the correlation coefficient calculation unit is the smaller, from among two of the events corresponding to the second correlation coefficient, in a case where the second correlation coefficient calculated by the second correlation coefficient calculation unit is greater than a second predefined threshold value;
a probability distribution calculation unit that, for each of events, calculates in a processor a probability distribution of a worst value among the measured values that have been measured during a period of time from a time at which the event occurs until a predefined time has elapsed therefrom, on the basis of the event information and of the measured value information, and that thereby generates beforehand a probability distribution to be referred to upon prediction of the occurrence of a service level agreement breach;
a probability calculation unit that refers to the probability distribution calculated by the probability distribution calculation unit and to an agreement threshold value of the service item, and that calculates, for each of the events and an entire system, a probability that applies to a service level agreement breach and a probability that does not apply to the service level agreement breach, and that calculates, for each of the events, a probability that the event occurs when a service level agreement breach has not occurred within the predefined time and a probability that the event occurs when a service level agreement breach has occurred within the predefined time, on the basis of an expected value for each probability calculated;
a probability density calculation unit that refers in a processor to the measured value information, and calculates a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and
a breach occurrence probability calculation unit that, when the event occurs, calculates in a processor a probability that the agreement breach occurs within the predefined time after the occurrence of the event, by using the respective probabilities corresponding to the event and the respective probability densities corresponding to the measured values at a time of occurrence of the event.

2. The agreement breach prediction system according to claim 1, further comprising: a testing unit that tests whether the probability distribution calculated by the probability distribution calculation unit is a predefined distribution or not,
wherein the probability distribution calculation unit calculates the probability distribution on the basis of the measured value information and the event information corresponding to the probability distribution having been determined to be the predefined distribution by the testing unit.

3. The agreement breach prediction system according to claim 1, wherein the probability distribution is a normal distribution.

4. An agreement breach prediction method, comprising:
a correlation coefficient calculation step of referring to the measured value information for analysis and learning relating to a measured value of a service item included in a service level agreement, and calculating, for each event that occurs in a target system of a service level agreement, a first correlation coefficient between a measured value at the time of occurrence of the event and a change value of the measured value in a period of time from occurrence of the event until a predefined time has elapsed;
a filtering step of excluding, from targets of event information for analysis and learning relating to the event, the event for which the first correlation coefficient calculated in the correlation coefficient calculation step is smaller than a predefined threshold value;
a second correlation coefficient calculation step of referring to the event information and calculating a second correlation coefficient between the respective events;
a second filtering step of excluding, from the targets of the event information, the event for which the first correlation coefficient calculated in the correlation coefficient calculation step is the smaller, from among two of the events corresponding to the second correlation coefficient, in a case where the second correlation coefficient calculated in the second correlation coefficient calculation step is greater than a second predefined threshold value;
a probability distribution calculation step of, for each of events, calculating in a processor a probability distribution of a worst value among the measured values that have been measured during a period of time from a time at which the event occurs until a predefined time has elapsed therefrom, on the basis of the event information and of the measured value information, and thereby generating beforehand a probability distribution to be referred to upon prediction of the occurrence of a service level agreement breach;

a probability calculation step of referring to the probability distribution calculated in the probability distribution calculation step and to an agreement threshold value of the service item, and calculating in a processor, for each of the events and an entire system, a probability that applies to a service level agreement breach and a probability that does not apply to the service level agreement breach, and that calculates, for each of the events, a probability that the event occurs when a service level agreement breach has not occurred within the predefined time and a probability that the event occurs when a service level agreement breach has occurred within the predefined time, on the basis of an expected value for each probability calculated;

a probability density calculation step of referring to the measured value information, and calculating in a processor a probability density of the measured value that applies to the service level agreement breach during a period of time from event occurrence until a predefined time has elapsed, and a probability density of the measured value that does not apply to the service level agreement breach during the period of time from the event occurrence until the predefined time has elapsed; and a breach occurrence probability calculation step of, when the event occurs, calculating in a processor a probability that the agreement breach occurs within the predefined time after the occurrence of the event, by using the respective probabilities corresponding to the event and the respective probability densities corresponding to the measured values at a time of occurrence of the event.

5. A non-transitory computer readable storage medium that stores an agreement breach prediction program for causing a computer to execute each step described in claim 4.

6. The agreement breach prediction system according to claim 2, further comprising:
   a correlation coefficient calculation unit that refers to the measured value information, and calculates, for each of the events, a first correlation coefficient between a measured value at the time of occurrence of the event and a change value of the measured value in a period of time from occurrence of the event until a predefined time has elapsed; and
   a filter unit that excludes, from targets of the event information, the event for which the first correlation coefficient calculated by the correlation coefficient calculation unit is smaller than a predefined threshold value.

7. The agreement breach prediction system according to claim 2, wherein the probability distribution is a normal distribution.

* * * * *